No. 12,541. REISSUED OCT. 9, 1906.
H. O. RUGH.
TELEPHONY.
APPLICATION FILED OCT. 20, 1905.
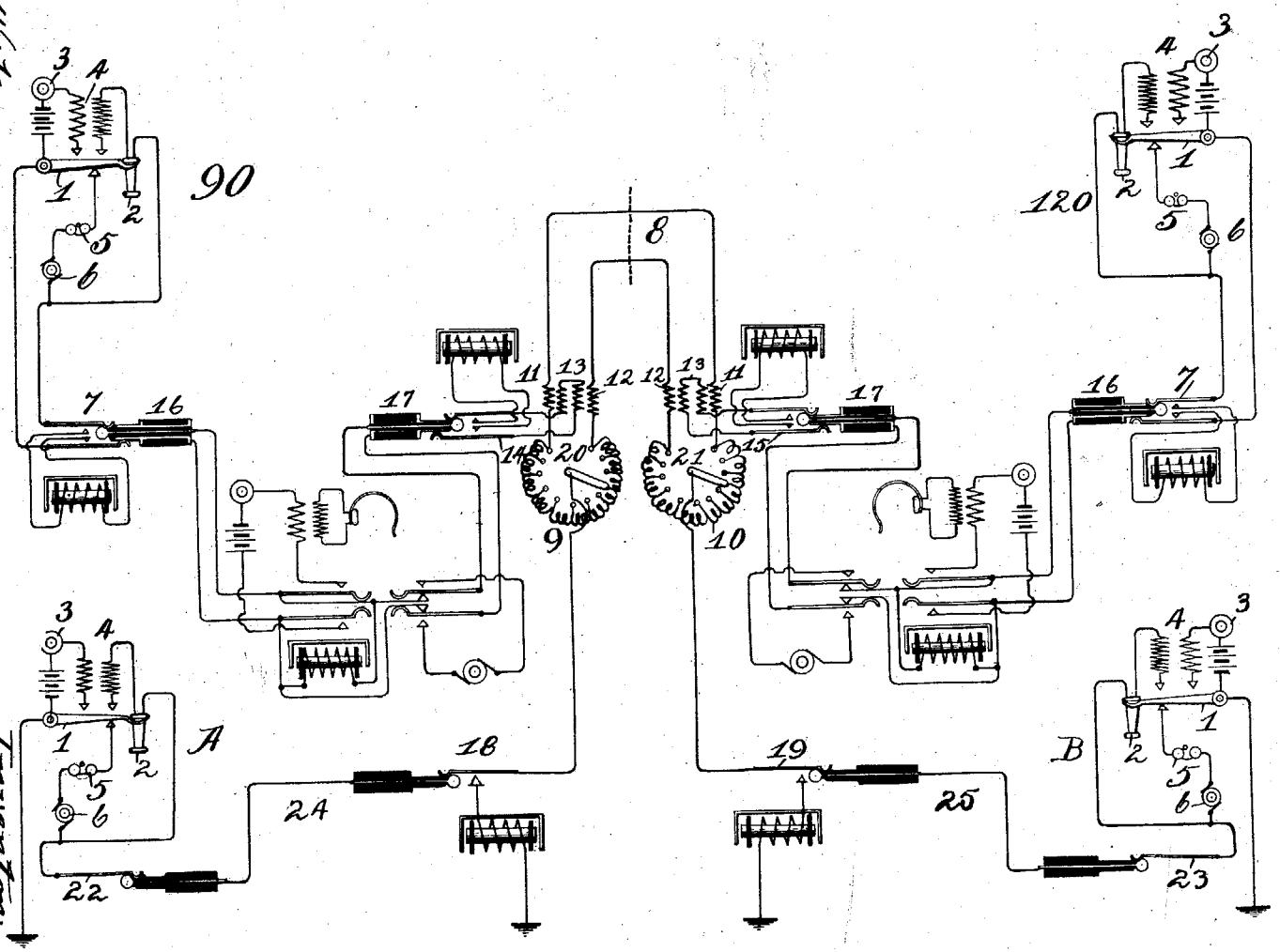
Witnesses:
Leon Stroh
W. R. Macdonald.
Inventor:
Harry O. Rugh.
By G. E. Crage
Attorney.

UNITED STATES PATENT OFFICE.

HARRY O. RUGH, OF CHICAGO, ILLINOIS, ASSIGNOR, BY MESNE ASSIGNMENTS, TO EDWARD C. HENNIS, OF SANDWICH, ILLINOIS.

TELEPHONY.

No. 12,541. Specification of Reissued Letters Patent. Reissued Oct. 9, 1906.

Original No. 747,481. dated December 22, 1903. Application for reissue filed October 20, 1905. Serial No. 283,712.

*To all whom it may concern:*

Be it known that I, HARRY O. RUGH, a citizen of the United States, residing at Chicago, in the county of Cook and State of Illinois, have invented a certain new and useful Improvement in Telephony, of which the following is a full, clear, concise, and exact description, reference being had to the accompanying drawing, forming a part of this specification.

My invention relates to telephony, and has for its object the provision of means to secure perfect transmission of voice-currents simultaneously between four subscribers over a talking-circuit including two metallic sides.

A system of telephony to which my invention is applicable embodies metallic sides of a circuit adapted for interposition between subscribers in communication and a grounded talking-circuit interposed between other subscribers in conversation, this grounded circuit including portions of the sides of the metallic circuit in multiple. A well-known instance of such a system as generally described above is one employing trunk-lines between exchanges, the trunk-lines being preferably in the form of closed metallic circuits in inductive relation with the telephone-lines or continuations of the telephone-lines that they unite. The terminals of the trunk-lines at the exchanges are associated with switching appliances and cord connecting apparatus adapted for connecting grounded telephone-lines therewith, the metallic-sided trunk-line being adapted for inclusion in circuit with the grounded telephone-lines, the sides of the trunk-line being connected in parallel in the grounded circuit. In this manner the double conversation may be carried on by way of the single trunk-line circuit.

Difficulty has been experienced hitherto in connection with systems embodying the characteristics above pointed out, in that the resistances of the metallic sides of the trunk-line are likely to be thrown out of equality, thereupon giving rise to cross-talk between the two telephonic circuits formed in part thereby, which circuits obviously should be telephonically distinct.

My invention consists in means for effecting compensation for variation in the resistances of the metallic sides of the circuit that is designed to complete both telephonic circuits. In the preferred embodiment of the invention I employ a rheostat included in loop-circuit with the said metallic circuit to include more resistance in one side and exclude resistance from the other side, as occasion may require.

Where the invention is applied to trunk-lines forming links in the double telephonic circuits, each trunk-line is preferably provided with a rheostat at each end thereof to be within the control of the operators, these rheostats being included in loop or closed circuit with the trunk-line, which trunk-line is inductively related, through the agency of repeating-coils, with the metallic telephone-lines that are to be united thereby and preferably in conductive relation with the grounded-circuit telephone-lines that are also to be united thereby, the arms of the rheostats preferably constituting terminals of conductors that are or are adapted to be the office-terminals of the grounded telephone-lines.

In the preferred embodiment of the invention the arms of the rheostats terminate in trunk-line springs, with which plugs of cord-circuits are adapted for engagement to effect complete connection between the grounded substations.

I will explain my invention more fully by reference to the accompanying drawing, which illustrates two metallic-circuit telephone-lines and two grounded-circuit telephone-lines, together with some of the associated central-office apparatus, these lines being united for conversation through the agency of a trunk-line associated with rheostats, constituting in its association with the trunk-line the preferred embodiment of my invention.

The apparatus at each of the substations 90 120 A and B is well understood by those skilled in the art, there being shown at each of these substations a telephone switch-hook 1, a telephone-receiver 2, a transmitter 3, the primary and secondary windings of an induction-coil 4, a call-bell 5, and a hand-operated magneto-generator 6, whereby signals may be sent and received and conversation carried on when connections have been properly established. The substations 90 and 120 have their lines terminating at the exchanges C and D, there being provided a spring-jack 7 for each of these telephone-lines, or in the event of a multiple switchboard it is obvious that the number of jacks may be multiplied.

In the embodiment of the invention shown a trunk-line 8 extends between the exchanges C and D, terminating in resistances 9 and 10. In the form of the invention shown the sides of the trunk-line form, with the resistances 9 and 10, a closed circuit, there being contained in the trunk-line repeating-coils 11 and 12, whereby the trunk-line is inductively related with coils 13 13, terminating in the trunk-line jacks 14 and 15 at the exchanges C and D. There is provided at each of the exchanges C and D usual cord connecting apparatus, including plugs 16 and 17, and as such cord connecting apparatus forms no especial part of my present invention a detailed description thereof will not be essential, as various elements entering into this apparatus are clearly illustrated diagrammatically.

When the metallic lines extending to the sations 90 and 120 are united for conversation as indicated in the drawing, telephonic currents arising in one line will by induction be set up in the trunk-line circuit and from this circuit be propagated to the other line. In order that the same trunk-line circuit extending between the exchanges may also serve to unite grounded lines, the trunk-line jacks 18 and 19 at the stations C and D may terminate in rheostat-arms 20 and 21, which by having metallic connection with the resistances 9 and 10 serve to connect the trunk-line jacks through both sides of the trunk-line, which are included in parallel, as will be apparent. The grounded telephone-lines extending from stations A and B may terminate in the spring-jacks 22 and 23 and there may be employed the usual cord connecting apparatus 24 and 25 for connecting the jacks 18 22 and 23 25. If the resistances in the sides of the trunk-line are exactly in balance, then voice-currents may be propagated over the trunk-line circuit between the two sets of telephone-lines without interference or cross-talk. If, however, the resistances are out of balance, as very frequently occurs, even after most careful adjustment and sometimes daily, then there will be interference and cross-talk, which by means of my invention I obviate, the most effective means being the employment of the resistances 9 and 10 in association with the rheostat-arms 20 and 21, which rheostat-arms obviously may be so adjusted as to compensate for variation in resistance between the sides of the trunk-line to render these resistances exactly equivalent, and thereby prevent cross-talk.

While the invention is of particular service in enabling the supplemental use of grounded telephone-lines as herein disclosed, I do not wish to be limited to these supplemented grounded telephone-lines, as transmission-lines uniting other than telephone-stations may be used in this supplemental way for conveying intelligence.

It is obvious that changes may readily be made in the system of my invention shown without departing from the spirit of the invention, and I do not, therefore, wish to be limited to the precise arrangement illustrated; but,

Having thus described my invention, I claim as new and desire to secure by Letters Patent—

1. In a telephone system, the combination with a metallic circuit employed in uniting telephone-substations for conversation, of grounded telephone-lines including the sides of the said circuit in parallel, and means at each exchange end of said circuit controlled by the respective exchange operator for compensating for difference in resistance between the sides of the said metallic circuit, whereby to prevent cross-talk, substantially as described.

2. In a telephone system, the combination with a metallic circuit employed in uniting telephone-substations for conversation, of grounded telephone-lines including the sides of the said circuit in parallel, and an adjusting resistance included in the metallic circuit at each exchange end thereof and controlled by the respective exchange operator for compensating for difference in resistance between its sides, whereby to prevent cross-talk, substantially as described.

3. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, and means at each end of the trunk-circuit and controlled by the respective operator for compensating for difference in resistance between the sides of the trunk-line, whereby to prevent cross-talk, substantially as described.

4. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, and an adjusting resistance included in the trunk-line circuit at each exchange end thereof and controlled by the respective exchange operator for compensating for difference in resistance between the sides of the trunk-line, to prevent cross-talk, substantially as described.

5. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, means at each exchange end of said trunk-line and controlled by the respective exchange operator for compensating for difference in resistance between the sides of the trunk-line, to prevent cross-talk, and a repeating-coil inductively associating the trunk-line with the telephone-line, substantially as described.

6. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, an adjusting resistance included in the trunk-line circuit at each exchange end thereof and controllable by the respective exchange operator for compensating for difference in resistance between the sides of the trunk-line, to prevent cross-talk between the metallic circuit and the grounded circuit, and a repeating-coil inductively associating the trunk-line with the telephone-line, substantially as described.

7. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, means at each exchange end of the trunk-line and controlled by the respective exchange operator for compensating for difference in resistance between the sides of the trunk-line, to prevent cross-talk, and two repeating-coils, one at each end of the trunk-line circuit, for inductively associating the trunk-line with the subscribers' lines, substantially as described.

8. In a telephone system, the combination with metallic-circuit telephone-lines extending from substations to an exchange, of a double-sided trunk-line for uniting the subscribers' lines, grounded-circuit telephone-lines having included in their circuit the sides of the trunk-line in parallel, an adjusting resistance included in the trunk-line circuit at each exchange end thereof and controlled by the respective exchange operator for compensating for difference in resistance between the sides of the trunk-line, to prevent cross-talk between the metallic circuit and the grounded circuit, and two repeating-coils, one at each end of the trunk-line circuit, for inductively associating the trunk-line with the subscribers' lines, substantially as described.

9. In a telephone system, the combination with a metallic circuit employed in uniting telephone-substations for conversation, of grounded transmission-lines including the sides of the said circuit in parallel, and means at each exchange end of said circuit controlled by the respective exchange operator for compensating for difference in resistance between the sides of the said metallic circuit, substantially as described.

10. In a telephone system, the combination with a metallic circuit employed in uniting telephone-substations for conversation, of grounded transmission-lines including the sides of the said circuit in parallel, and an adjusting resistance included in the metallic circuit at each exchange end thereof and controlled by the respective exchange operator for compensating for difference in resistance between its sides, substantially as described.

11. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, and means at each end of the trunk-circuit and controlled by the respective operator for compensating for difference in resistance between the sides of the trunk-line, substantially as described.

12. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, and an adjusting resistance included in the trunk-line circuit at each exchange end thereof and controlled by the respective exchange operator for compensating for difference in resistance between the sides of the trunk-line, substantially as described.

13. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, means at each exchange end of said trunk-line and controlled by the respective exchange operator for compensating for difference in resistance between the sides of the trunk-line, and a repeating-coil inductively associating the trunk-line with a telephone-line, substantially as described.

14. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, an adjusting resistance included in the trunk-line circuit at each exchange end thereof and controllable by the respective exchange operator for compensating for difference in resistance between the sides of the trunk-line, and a repeating-coil inductively associating the trunk-line with a telephone-line, substantially as described.

15. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, means at each exchange end of the trunk-line and controlled by the respective exchange operator for compensating for difference in resistance between the sides of the trunk-line, and two repeating-coils, one at each end of the trunk-line circuit, for inductively associating the trunk-line with subscribers' lines, substantially as described.

16. In a telephone system, the combination with metallic-circuit telephone-lines extending from substations to an exchange, of a double-sided trunk-line for uniting the subscribers' lines, grounded-circuit transmission-lines having included in their circuit the sides of the trunk-line in parallel, an adjusting resistance included in the trunk-line circuit at each exchange end thereof and controlled by the respective exchange operator for compensating for difference in resistance between the sides of the trunk-line, and two repeating-coils, one at each end of the trunk-line circuit, for inductively associating the trunk-line with subscribers' lines, substantially as described.

In witness whereof I hereunto subscribe my name this 5th day of October, A. D. 1905.

HARRY O. RUGH.

Witnesses:

LEON STROH,

G. L. CRAGG.